(12) United States Patent  (10) Patent No.: US 8,351,471 B2
Rigal  (45) Date of Patent: Jan. 8, 2013

(54) SATELLITE COMMUNICATIONS SYSTEM HAVING TRANSMITTING STATION DIVERSITY

(75) Inventor: Christian Rigal, Portet sur Garonne (FR)

(73) Assignee: Thales, Neuilly sur Seine (FR)

( * ) Notice: Subject to any disclaimer, the term of this patent is extended or adjusted under 35 U.S.C. 154(b) by 605 days.

(21) Appl. No.: 11/993,719

(22) PCT Filed: Jun. 15, 2006

(86) PCT No.: PCT/FR2006/050564
§ 371 (c)(1), (2), (4) Date: Jun. 10, 2009

(87) PCT Pub. No.: WO2006/136746
PCT Pub. Date: Dec. 28, 2006

(65) Prior Publication Data
US 2010/0020743 A1    Jan. 28, 2010

(30) Foreign Application Priority Data
Jun. 21, 2005    (FR) ..................................... 05 51683

(51) Int. Cl.
*H04J 3/06* (2006.01)
(52) U.S. Cl. ........................................ 370/503; 370/507
(58) Field of Classification Search .................. 370/319, 370/503, 507, 509, 510
See application file for complete search history.

(56) References Cited

U.S. PATENT DOCUMENTS

| 3,829,777 | A | * | 8/1974 | Muratani et al. | ................... 455/8 |
| 5,774,555 | A | * | 6/1998 | Lee et al. | ........................... 381/4 |
| 6,169,450 | B1 | * | 1/2001 | Gentzler | ......................... 330/52 |
| 6,590,881 | B1 | * | 7/2003 | Wallace et al. | ................ 370/332 |
| 2001/0021195 | A1 | | 9/2001 | Miller et al. | |
| 2002/0003495 | A1 | | 1/2002 | Johnstone et al. | |
| 2003/0164802 | A1 | * | 9/2003 | Lindenmeier | ................. 343/713 |
| 2005/0001563 | A1 | * | 1/2005 | Logan | ........................... 315/291 |
| 2006/0171491 | A1 | * | 8/2006 | Tapaninen et al. | ............ 375/343 |
| 2008/0212702 | A1 | * | 9/2008 | Pan et al. | ....................... 375/260 |

FOREIGN PATENT DOCUMENTS

EP    0936766    8/1999

* cited by examiner

*Primary Examiner* — Farah Faroul
(74) *Attorney, Agent, or Firm* — Lowe, Hauptman, Ham & Berner, LLP

(57) ABSTRACT

The invention relates to a method for transmitting signals termed useful signals via a satellite by means of connection stations. To this end, a first connection station (CNX1) carries out the generation of a first service signal on a service carrier frequency dubbed the pilot signal (Fp), and the transmission of this pilot signal to at least one second connection station (CNX2). The use of this pilot signal ensures phase synchronization and temporal synchronization of the signals so as to implement a transmit diversity, that is to say to toggle the transmission of the useful signal by this second connection station without loss of phase synchronization between the two stations. The invention applies to the Frequency Division Multiple Access (FDMA) signal communications by satellites.

16 Claims, 3 Drawing Sheets

SATELLITE COMMUNICATIONS SYSTEM HAVING TRANSMITTING STATION DIVERSITY

CROSS-REFERENCE TO RELATED APPLICATIONS

The present Application is based on International Application No. PCT/FR2006/050564 filed on Jun. 15, 2006, which in turn corresponds to French Application No. 05 51683 filed on Jun. 21, 2005 and priority is hereby claimed under 35 USC §119 based on these applications. Each of these applications are hereby incorporated by reference in their entirety into the present application.

FIELD OF THE INVENTION

The invention relates to the field of satellite communications.

BACKGROUND OF THE INVENTION

The invention applies to telecommunication systems using a transmission technique termed Frequency Division Multiple Access, this technique being known by the acronym FDMA.

Transmission or reception of signals via a satellite is done by means of connection stations (gateways) distributed over the surface of the Earth. To allow access by broadband transmission systems, the connection stations are overdimensioned in the radiofrequency (RF) part and consequently have a high cost. Despite this, most budgets show that the uplink (transmit direction) retains a non-negligible share of unavailability related to poor atmospheric conditions (rain), in particular for links from 30 GHz upwards.

The potential clients of these systems desire an improvement in the service.

To solve this problem, the Applicant proposes to implement a solution consisting in affording transmit site diversity.

Solutions for implementing diversity already exist for the reception of signals via a satellite.

However the present case deals with implementing site diversity for the uplink, that is to say at the transmit end, thereby posing a particular problem.

Specifically, the demodulators of the terminals operate on a carrier that is assumed to be coherent and continuous. Consequently, any loss of phase synchronization or temporal synchronization induces the equivalent of a cycle jump with a significant packet of errors and this may produce a return to the acquisition mode of the terminal with re-connection of the users.

Thus to implement site diversity at the transmit end in this type of system, the problem identified by the Applicant is the toggling of the signal between two remote sites, the distances of the sites being able for example to be about 5 to 30 km, while ensuring that the carrier has the same lag and the same phase on reception by the terminals. The solution must be able to be applied to carrier frequencies of possibly 30 GHz, optionally 14 GHz (in practice to any carrier frequency). To this end, the invention proposes a solution consisting in using a first and a second remote connection station, in slaving the signals of the first and second connection station so as to toggle from one to the other in the event of heavy rain without loss of the synchronization for the carrier.

The invention does not require any particular implementation at the level of the demodulator of the terminals, complying with the cost constraints related to these markets.

SUMMARY OF THE INVENTION

The subject of the invention is more particularly a method for transmitting signals termed useful signals via a satellite by means of connection stations, the transmission being done in a defined transmission band, mainly characterized in that it comprises for a first connection station the following steps:
  the generation of a first service signal on a service carrier frequency dubbed the pilot signal, and the transmission of this pilot signal to at least one second connection station;
  the use of this pilot signal to ensure phase synchronization and temporal synchronization of the signals so as to implement a transmit diversity, that is to say to toggle the transmission of the useful signal by this second connection station without loss of phase synchronization between the two stations.

According to another characteristic, the method consists in allocating a part of the transmission band to the service signal or signals, notably to the pilot signal.

In a practical manner, the first connection station generates—a useful signal by modulation of a carrier frequency on the basis of an input signal and—a transmission carrier frequency; the method then comprises the following steps:
  the distribution of the transmission carrier frequency between the two connection stations,
  the distribution of the pilot signal between the two connection stations with a phase shift of 180°;
  the observation of the levels of at least the pilot signal at the output of the transponder of the satellite by reception from the first connection station so as to detect poor transmission conditions;
  the toggling of the useful signal to the second connection station with a 180° phase shift so as to be in phase with the useful carrier of the first connection station;
  the replacement of the useful carrier frequency of the first station by the pilot signal phase shifted by 180°.

According to another characteristic, the method furthermore comprises the generation of a second service signal dubbed the test signal to make it possible to switch to calibration mode, this mode consisting in carrying out a balancing of the paths of the transmission carrier frequency distributed over the first and the second connection station.

Advantageously, the calibration mode is triggered outside of a switch to transmit diversity, and consists in:
  coupling the useful signal to the test signal and transmitting it by the first connection station at the transmission carrier frequency,
  distributing the transmission carrier frequency and the pilot signal to the second connection station,
  toggling into transmission mode by the second connection station, which then receives the test signal in place of the useful signal, coupled to the pilot signal phase shifted by 180°,
  processing the return signal to control the value of the phase shift.

The object of the invention is also a system for transmitting signals termed useful signals, via a satellite by means of connection stations, the transmission being done in a defined transmission band, mainly characterized in that it comprises means for implementing the transmit diversity between at least two connection stations comprising:
  means for generating a first service signal dubbed the pilot signal,
  means for distributing this pilot signal over the two connection stations to ensure phase synchronization and temporal synchronization of the signals, thus making it possible to be able to toggle the transmission of the useful signal by the second connection station without loss of phase synchronization between the two stations, means for toggling to transmit by the second station.

According to another characteristic, the distribution means comprise:
- a channel ensuring the link with the second connection station,
- a phase shifter followed by a variable-delay circuit in the first connection station for effecting a defined phase shift and introducing a defined lag on the pilot signal transmitted with the useful signal mixed with the transmission frequency to the transmitter of this station,
- a phase shifter in the link channel for effecting the same phase shift on the pilot signal when the latter is coupled to the useful signal so as to be transmitted to the transmitter of the second connection station.

According to another characteristic, the toggling means (transmit diversity) comprise:
- a first switch in the first connection station allowing the transmission of the pilot signal coupled to the useful signal or the transmission of the pilot signal to the transmitter of this first station;
- a second switch in the link channel for the transmission of the pilot signal coupled to the useful signal or the transmission of the pilot signal to the transmitter of the second connection station;
- a control facility for these two switches.

Advantageously, the phase shifters each comprise two 90° couplers so as to obtain phase opposition between the signals distributed to the two connection stations.

According to another characteristic the system furthermore comprises means for generating a second service signal dubbed the test signal frequency, means for distributing this test signal over the first and the second connection station, and means for toggling to calibration mode, all these means making it possible to carry out a balancing of the paths of the transmission carrier frequency distributed over the first and the second connection station.

The invention also relates to a connection station comprising a transmitter able to transmit a useful signal in a defined transmission band, characterized in that it comprises:
- means for generating at least one first service signal dubbed the pilot signal,
- means for distributing this pilot signal to its transmitter and to a channel for linking to at least one other connection station,
- means for transmitting this pilot signal in the defined transmission band,
- means for toggling to transmit by the second station.

According to another characteristic, the distribution means comprise a first switch allowing the transmission of the pilot signal coupled to the useful signal or the transmission of the pilot signal, to the transmitter.

Still other advantages of embodiments according to the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
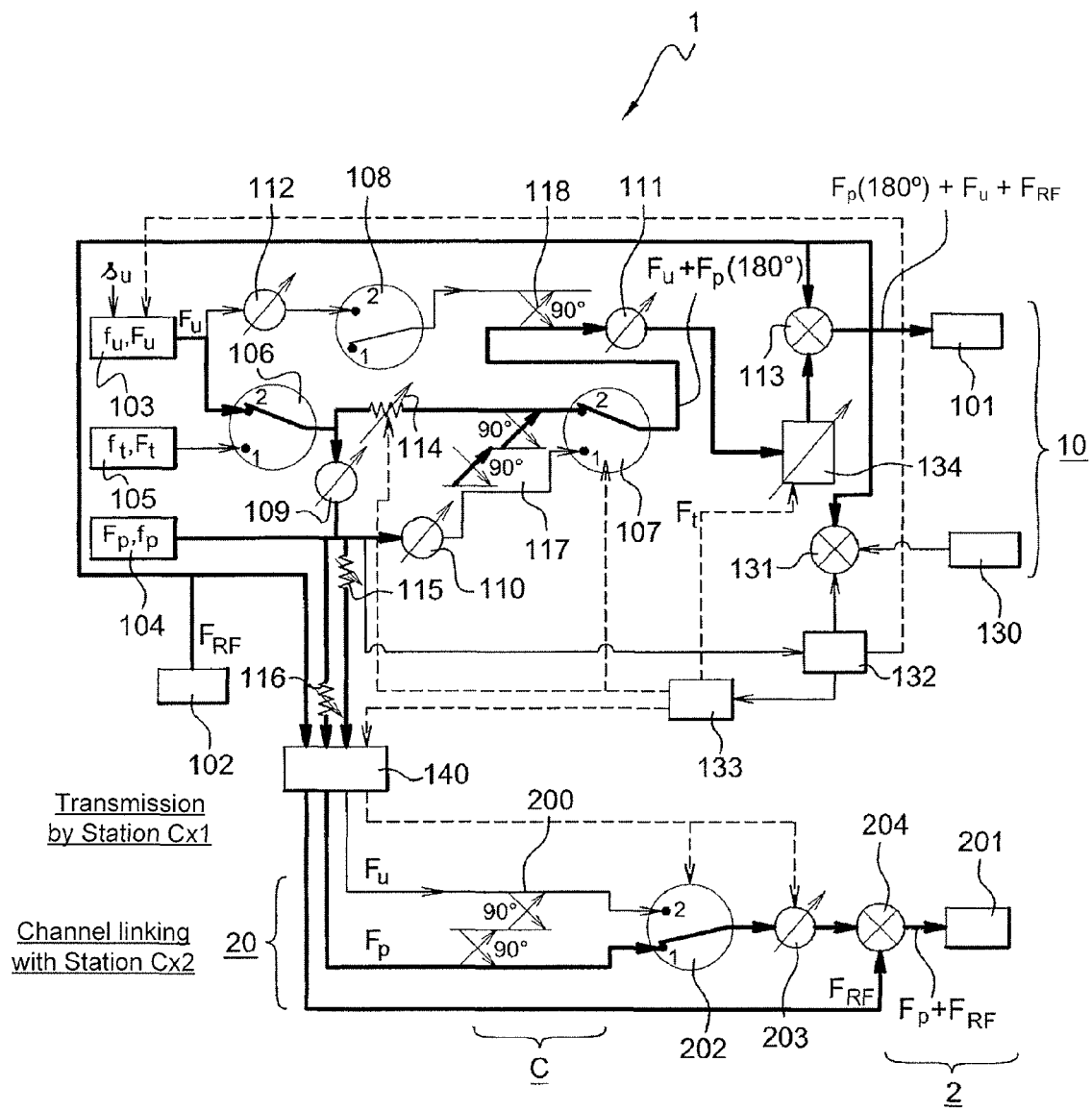
FIG. 1 represents the basic diagram of a device making it possible to implement the transmit connection station diversity in a transmit configuration by the first station.
Figure 2:
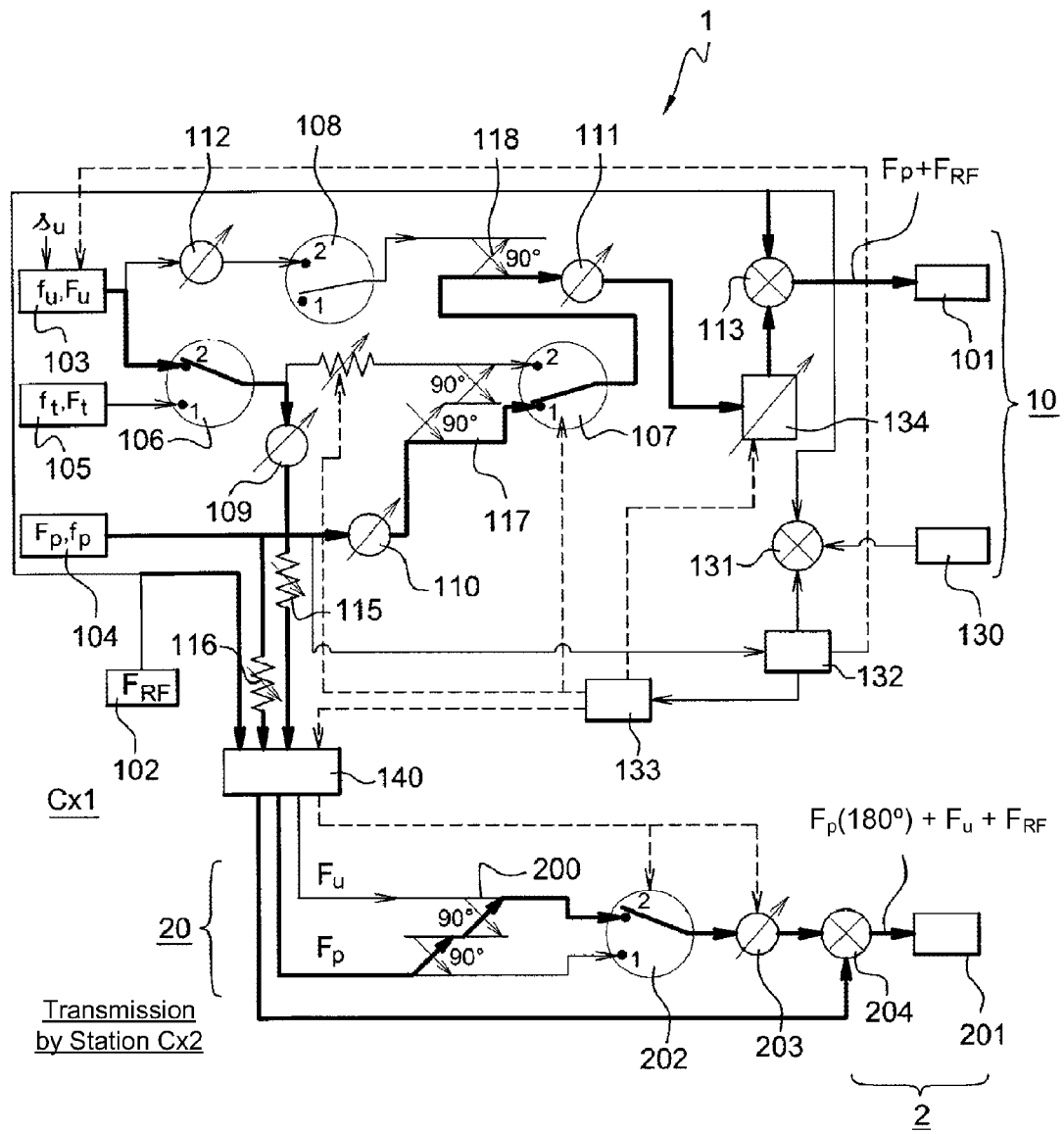
FIG. 2 represents the diagram of the device according to FIG. 1 in a transmit operation by the second station.
Figure 3:
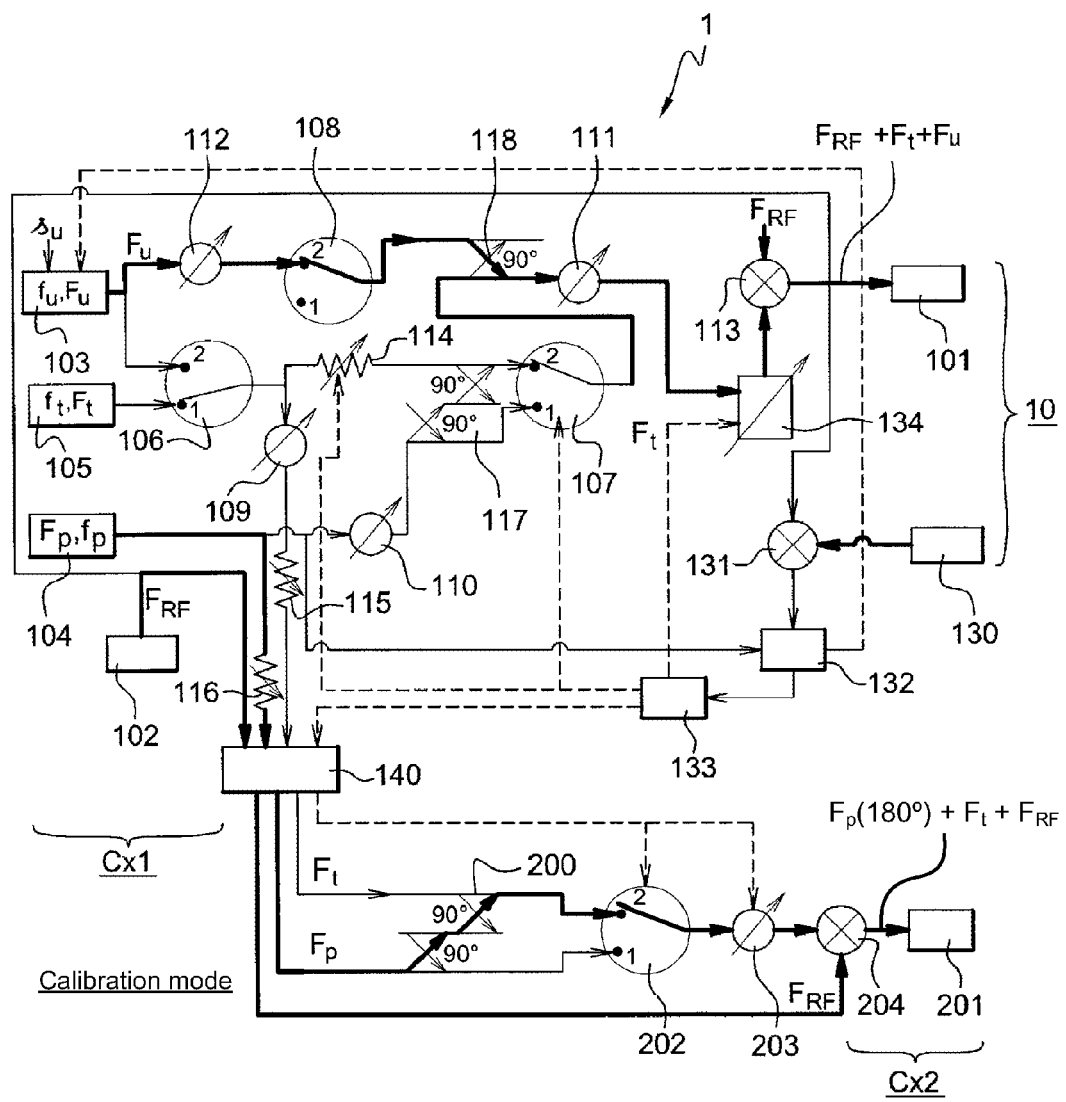
FIG. 3 represents the diagram of the device according to FIG. 1 when operating in calibration mode.

The method of communication according to the present invention is implemented by the device 1 illustrated in FIGS. 1, 2 and 3. The diagrams of these FIGS. 1, 2, 3 illustrate dynamic operation of the device of the invention, as described subsequently.

The method implements the following steps:

The allocation of a part of the transmission band to at least one predefined service signal, synchronous with the useful signal in terms of symbol rate and modulating a service carrier frequency fp, signal dubbed the pilot $F_p$;

The modulation by an input signal, in a first connection station of a useful carrier frequency $f_u$, to generate the useful signal $F_u$, The distribution of the transmission carrier frequency $F_{RF}$ between the two connection stations;

The distribution of the pilot signal $F_p$ between the two connection stations with a phase shift of 180°;

The observation of the levels of at least the pilot signal $F_p$ and the useful signal at the first connection station so as to detect poor transmission conditions;

The toggling of the useful signal $F_u$ towards the second connection station with a 180° phase shift so as to be in phase with the useful signal of the first connection station;

The replacement of the useful signal of the first site by the pilot signal phase shifted by 180°.

This solution thus makes it possible to afford a solution for slaving the signals arising from the two remote connection stations without loss of synchronization of the carrier frequency so as to be able to toggle from one to the other in the event of poor transmission conditions.

According to another characteristic of the invention, the slaving of the lag of the phase between the signals is carried out on signals in phase opposition thereby affording better sensitivity in the recombination. Insofar as the phase opposition between two signals can be slaved with a precision of 1 dB, even if the levels are not strictly identical, it is possible to have, on a pathway with 180° phase shift, a recombination with a phase varying by less than 5° (peak to peak).

The implementation device 1 comprises a transmit/receive part 10 installed in a first connection station CX1 to ensure the uplink of the useful signal and a part 20 ensuring the terrestrial link between this first station and a second station CX2.

This useful signal $F_u$ of carrier frequency $f_u$, hereinafter dubbed the useful signal, is transmitted in the transmission band by the transmitter 101 of the station CX1. Before transmission, the useful signal passes from the intermediate frequency to the transmission frequency $F_{RF}$ through a frequency transposition operation.

The first part 10 of the device 1 comprises:
- a local frequency generator 102 able to generate the frequency $F_{RF}$ hereinafter dubbed the reference frequency which makes it possible to perform the required frequency transposition. In the practical embodiment given as an example the frequency is 29 GHz for a 30 GHz link.

a generator 103 embodied for example by a DVB-S or DVB-S2 modulator producing the useful signal $F_u$ by modulating a useful carrier frequency $f_p$ by the input signal a modulator 104 generating a modulated signal, synchronous with the useful signal, at a carrier frequency hereinafter dubbed the pilot signal $F_p$ making it possible, as will be seen subsequently, to obtain a slaving of the phase of the signal transmitted between the station 1 and the station 2 during the toggling, the station 2 transmitting in replacement for the station 1.

a modulator 105 generating a modulated signal synchronous with the useful signal, of carrier frequency $f_t$. This signal is hereinafter dubbed the test signal $F_t$ and is used to carry out a calibration of the paths of the transmission frequency $F_{RF}$.

three toggling switches referenced respectively 106, 107, 108 are placed on the path of the output signals of the modulators 103, 104, 105.

slaving phase shifters 109, 110, 111, 112 are envisaged on these same paths. The phase shifter 109 is placed after the output of the switch 106, the phase shifter 110 is placed at the output of the modulator 104 and the phase shifter 111 is placed after a coupling of the outputs of the switches 107 and 108. The phase shifter 112 is placed between the output of the modulator 103 and an input of the switch 108.

a receiver 130 matched to the transmission channel in which there is a signal making it possible to detect the conditions of poor transmission related in particular to the atmospheric conditions. This channel transports notably the test signal $F_t$ and a satellite beacon signal, that is to say a signal generated by the satellite.

two mixers 113 and 131. The mixer 113 is envisaged to mix the signals arising from the local generator 102 and the output signal from the phase shifter 111 after it enters a variable-delay circuit 134. The mixer 131 makes it possible to mix the reference signal $F_{RF}$ with the signal received by the receiver 130.

variable attenuators 114, 115, 116 are also placed on these paths. The attenuator 114 is placed after the output of the switch 106 and an input of the switch 107. The attenuator 115 is placed at the output of the phase shifter 109. The attenuator 116 is placed after the output of the modulator 104.

couplers 117 and 118 are also envisaged. The coupler 117 is formed of two 90° couplers making it possible to obtain a phase shift phi advantageously equal to 180°.

the variable-delay circuit 134 for introducing a controllable lag, placed between the phase shifter 111 and the mixer 113. This facility can vary the delay on its path in increments of the order of a symbol fraction of the useful signal.

a demodulator of the pilot signal $F_p$ and of the test signal $F_t$ and levels detector 132.

a station CX1-station CX2 toggling decision and control facility 133.

a facility 140 for connection to a terrestrial link.

The second part 20 of the device comprises a transmission channel C ensuring a terrestrial link with the second station CX2 and in particular with the transmitter 201. This transmission channel comprises:

a coupler 200 embodied by two 90° couplers making it possible to introduce a phase shift of 180° on the pilot signal $F_p$ for coupling with the useful signal $F_u$;

a switch 202 for receiving the useful carrier frequency $F_u$ on one switching input and the pilot carrier frequency $F_p$ on another switching input. This switch 202 is controlled by the control facility 133;

phase shifter with control 203 receives the output signal from the switch 202 and is commanded by the control facility 133;

a mixer 204 receives the output signal from the phase shifter 203 on one input and the signal the transmission carrier frequency, that is to say the reference frequency $F_{RF}$, on another input;

the output signal from the mixer is applied to the input of the transmitter of the second station 2.

In the absence of difficulty of transmission, that is to say when no poor transmission condition has been detected, the switches are in the position illustrated in FIG. 1. In particular, the switches 106 and 107 are positioned on their input 2 in such a way that at the output of the switch 107 is the useful signal $F_u$ coupled to the pilot signal $F_p$, the latter having undergone a phase shift of 180°. The switch 202 receives the pilot signal $F_p$ on its input 1. The transmitter 201 of the second station thus receives the pilot signal $F_p$ arising from the modulator 104, mixed with the signal generated by the local oscillator 105, that is to say the transmission carrier frequency $F_{RF}$.

FIG. 2 illustrates the toggling taking place when a degradation in the transmission conditions is detected. The switch 202 commanded by the facility 133 toggles over to its second input 2 which receives the useful signal $F_u$ coupled to the pilot signal $F_p$ across the two 90° couplers.

Thus, the device makes it possible to simultaneously toggle the useful signal over to the other site and the transmission carrier frequency via a pathway with 180° phase shift. In this way, the useful signal transmitted by the site CX2 is automatically synchronous and in phase with the useful carrier of the first site CX1.

Furthermore the switch 107 is commanded by the facility 133 in such a way as to position itself on its input 1 so as to receive the pilot signal $F_p$. In this way the useful signal $F_u$ for the first site is replaced with the pilot signal $F_p$. The device is ready to return to the initial state when the transmission conditions become correct again.

The detection device 132 is capable of detecting the rain threshold and of controlling the site toggling. This device 132 is also linked to the modulator so as to have a reference signal, a replica of the pilot signal. It makes it possible to synchronize to the frame of the signal received if required, and to detect the adjustment of the phase shifter 111 and of the variable-delay circuit (lag) 134 so as to minimize the pilot signal power received by the receiver 130. With this power information, the facility 133 commands the slaving phase shifters 111 and 203, the variable-delay circuit 134, the attenuators for balancing the levels 114 and 115, the toggling switches 107 and 202.

When the system previously described is put into service, it is placed in the state indicated in FIG. 1. It is thus seen that with these switch positions, the useful signal $F_u$ and the pilot signal $F_p$ are dispatched to the transmitter 101. Only the pilot signal $F_p$ is dispatched to the transmitter 201 and the two signals have a phase of 180° with the required attenuation obtained by the attenuators 110 and 203 commanded by the device 133. In practice, the control facility 133 then commands only the phase shifter 203 and the delay circuit 134 so as to obtain a minimum of power on the pilot signal.

Employing the fact that the station possesses antennas that are well dimensioned (for its other functions), a minimum useful signal power to noise ratio C/N of about 20 dB is obtained for a normal carrier, the detection of the zero therefore has a dynamic range of this order.

Moreover, this involves a pilot (of known PN sequence type), it is therefore possible to operate the estimator on several symbols and also to gain in terms of precision. The relative level of the attenuators 114 and 115 is adjusted so as to have a slightly smaller gain on the site CX2 than the site CX1 (about 4 dB).

When the toggling decision is taken the following sequence is performed:
- toggling of the switch 107 (cut off the useful signal on the site CX1),
- toggling of the switch 202 (transmit the useful signal on the site 2, in phase),
- adjustment of the attenuator 115 so as to have the level of PIRE required (ULPC).

If the time interval between the 2 togglings is of the order of the duration of a symbol, the risk of information loss is limited; possibly, there is no loss. In any case, the synchronization of the demodulators is disturbed by only a few degrees (about ±5°) and the carrier reconstruction loop recovers this bias after at most 1000 symbols.

To return to the initial state, the device effects the symmetric functions, in particular with the phase shifter 111, the sequence inverse to that just described is implemented.

The first part 10 of the device 1 just described furthermore comprises a part whose function is the calibration of the paths of the transmission frequency $F_{RF}$ distributed over the two connection stations.

This path balancing part comprises the test modulator 105 as well as the switch 108, the phase shifters 109, 112 and the attenuator 116. Specifically, these elements serve to calibrate the balance of the RF paths (transmission carrier frequency) by introducing into the signal transmitted, in addition, another service signal dubbed the test signal $F_t$. This signal is also in the band edge, though this does not disturb transmission. The test signal $F_t$ is generated by the modulator 105.

The diagram of FIG. 3 illustrates the operation of the device of the invention in calibration mode. The various switches are in the position indicated by this figure.

Operation in calibration mode can be triggered outside of transmit diversity operation. The function of this mode is invoked periodically without disturbing the mission. The return signal is processed by the demodulator 132 and interpreted by the control facility 133 so as to adjust the phase shifters 109, 112 and the attenuators 114 and 115.

This mode consists for the first station CX1 in coupling the useful signal $F_u$ to the test signal $F_t$ and transmitting it at the transmission carrier frequency $F_{RF}$.

The transmission carrier frequency $F_{RF}$ and the pilot signal are distributed to the second connection station CX2.

The control facility 133 commands the switches 107 and 202 in such a way as to switch to transmit mode through the second connection station CX2, which then receives the test signal $F_t$ in place of the useful signal, coupled to the pilot signal $F_p$ phase shifted by 180° (modulator 202 toggles over to its input 2).

The signal received by the receiver 130 is processed so as to control the value of the phase shift and adjust the values of the phase shifters and attenuators.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method of transmitting a useful signal via a satellite in a predetermined transmission band, the method comprising:
   generating, by a first connection station, a pilot signal on a service carrier frequency and transmitting the pilot signal to a second connection station;
   performing transmission of the useful signal to the satellite by either the first connection station or the second connection station; and
   maintaining, using the pilot signal, phase synchronization and temporal synchronization of the useful signal transmitted by the first connection station and the useful signal transmitted by the second connection station,
   wherein the first connection station generates the useful signal by modulation of a carrier frequency on the basis of an input signal, and a transmission carrier frequency, the method further comprising the steps:
   distributing the transmission carrier frequency to the first connection station and the second connection station;
   transmitting the useful signal and the pilot signal having a first phase by a transmitter of first connection station;
   transmitting the pilot signal having a second phase by a transmitter of the second connection station, the second phase being the first phase shifted by 180°;
   observing the level of at least one of the pilot signal and the useful signal from the transmitter of the first connection station to detect poor transmission conditions;
   transmitting the useful signal by the transmitter of the second connection station to be in phase with the useful signal from the transmitter of the first connection station; and
   ceasing the transmission of the useful signal from the transmitter of the first connection station.

2. The transmission method as claimed in claim 1, further comprising allocating a part of the transmission band to the pilot signal.

3. The transmission method as claimed in claim 2, further comprising generating a test signal for enabling a calibration mode, the calibration mode carrying out a balancing of paths of a transmission carrier frequency distributed over the first connection station and the second connection station.

4. The transmission method as claimed in claim 1, further comprising generating a test signal for enabling a calibration mode, the calibration mode carrying out a balancing of paths of a transmission carrier frequency distributed over the first connection station and the second connection station.

5. The transmission method as claimed in claim 4, wherein the calibration mode is triggered outside of a switch to transmit diversity, the method further comprising:
   coupling the useful signal to the test signal and transmitting the coupled signal by the first connection station at the transmission carrier frequency;
   distributing the transmission carrier frequency and the pilot signal to the second connection station;
   setting the second connection station into transmission mode for transmitting the test signal in place of the useful signal, coupled to the pilot signal having phase shifted by 180°; and
   processing a return signal to control the value of the phase shift.

6. The transmission method as claimed in claim 1, wherein the transmission of the pilot signal from the first connection station to the second connection station is performed by using a terrestrial link between the first connection station and the second connection station.

7. A system for transmitting a useful signal via a satellite in a predetermined transmission band, the system comprising means for implementing a transmit diversity between a first connection station and a second connection station, the system comprising:
    means for generating a pilot signal;
    means for toggling the transmission of said useful signal between the first connection station and the second connection station; and
    means for distributing the pilot signal over the first connection station and the second connection station and maintaining phase synchronization and temporal synchronization of the useful signal transmitted by the first connection station and the useful signal transmitted by the second connection station,
    wherein the means for distributing comprises:
    a channel for linking the first connection station and the second connection station;
    a phase shifter followed by a variable-delay circuit in the first connection station for effecting a defined phase shift and introducing a defined lag on the pilot signal transmitted with the useful signal mixed with a transmission carrier frequency in the transmission band at a transmitter of the first connection station; and
    a phase shifter in the channel for effecting the same phase shift on the pilot signal when the pilot signal is coupled to the useful signal to be transmitted to a transmitter of the second connection station.

8. The transmission system as claimed in claim 7, wherein the means for toggling comprise:
    a first switch in the first connection station for transmitting the pilot signal coupled to the useful signal or for transmitting the pilot signal to the transmitter of the first connection station;
    a second switch in the channel for transmitting the pilot signal coupled to the useful signal or for transmitting the pilot signal to the transmitter of the second connection station; and
    a control facility for controlling the first and second switches.

9. The transmission system as claimed in claim 8, further comprising:
    means for generating a test signal;
    means for distributing the test signal over the first connection station and the second connection station; and
    means for toggling the transmission system to calibration mode,
    wherein the means for generating, the means for distributing, and the means for toggling carry out a balancing of paths of the transmission carrier frequency distributed over the first connection station and the second connection station.

10. The transmission system as claimed in claim 7, wherein each of the phase shifters comprises two 90° couplers to obtain phase opposition between the useful signal distributed to the first connection station and the useful signal distributed to the second connection station.

11. The transmission system as claimed in claim 10, further comprising:
    means for generating a test signal;
    means for distributing the test signal over the first connection station and the second connection station; and
    means for toggling the transmission system to calibration mode,
    wherein the means for generating, the means for distributing, and the means for toggling carry out a balancing of paths of the transmission carrier frequency distributed over the first connection station and the second connection station.

12. The transmission system as claimed in claim 7, further comprising:
    means for generating a test signal;
    means for distributing the test signal over the first connection station and the second connection station; and
    means for toggling the transmission system to calibration mode,
    wherein the means for generating, the means for distributing, and the means for toggling carry out a balancing of paths of a transmission carrier frequency distributed over the first connection station and the second connection station.

13. The transmission system as claimed in claim 7, further comprising:
    means for generating a test signal;
    means for distributing the test signal over the first connection station and the second connection station; and
    means for toggling the transmission system to calibration mode, wherein the means for generating, the means for distributing, and the means for toggling carry out a balancing of paths of the transmission carrier frequency distributed over the first connection station and the second connection station.

14. The transmission system as claimed in claim 7, wherein the channel for linking comprises a terrestrial link coupled between the first connection station and the second connection station.

15. A connection station, comprising:
    a transmitter for transmitting a useful signal in a predetermined transmission band;
    means for generating a pilot signal;
    means for toggling the transmission of the useful signal between at least the connection station and another connection station; and
    means for distributing the pilot signal to the transmitter and maintaining phase synchronization and temporal synchronization of the useful signal transmitted by the connection station and the useful signal transmitted by another connection station,
    wherein the means for distributing comprises:
    a channel for linking the connection station and the another connection station;
    a phase shifter followed by a variable-delay circuit for effecting a defined phase shift and introducing a defined lag on the pilot signal transmitted with the useful signal mixed with a transmission carrier frequency in the transmission band at the transmitter; and
    a phase shifter in the channel for effecting the same phase shift on the pilot signal when the pilot signal is coupled to the useful signal to be transmitted to a transmitter of the another connection station.

16. The connection station as claimed in claim 15, wherein the means for distributing further comprises a first switch for transmitting the pilot signal coupled to the useful signal or for transmitting the pilot signal, to the transmitter.

* * * * *